(12) United States Patent
Ostrander et al.

(10) Patent No.: US 11,348,700 B2
(45) Date of Patent: May 31, 2022

(54) BOILING WATER REACTOR BLADE GUIDE AND EXCHANGE TOOL

(71) Applicant: GE-Hitachi Nuclear Energy Americas LLC, Wilmington, NC (US)

(72) Inventors: Kristoffer Ostrander, Wilmington, NC (US); Robert W. Whitling, Wilmington, NC (US); Brian J. Smith, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 421 days.

(21) Appl. No.: 16/412,979

(22) Filed: May 15, 2019

(65) Prior Publication Data
US 2020/0365288 A1 Nov. 19, 2020

(51) Int. Cl.
*G21C 19/10* (2006.01)
*G21C 19/20* (2006.01)

(52) U.S. Cl.
CPC ........... *G21C 19/10* (2013.01); *G21C 19/205* (2013.01); *G21C 19/207* (2013.01)

(58) Field of Classification Search
CPC ..... G21C 19/10; G21C 19/207; G21C 19/205
USPC ........................................ 376/260
See application file for complete search history.

(56) References Cited

U.S. PATENT DOCUMENTS

| 5,377,239 A | 12/1994 | Nopwaskey et al. |
| 6,047,037 A | 4/2000 | Wivagg |
| 8,934,601 B2 * | 1/2015 | Whitling ............... G21C 19/207 376/260 |
| 2014/0205050 A1 | 7/2014 | Kaufinann et al. |

FOREIGN PATENT DOCUMENTS

| DE | 19751688 C1 | 8/1999 |
| JP | H0772289 A | 3/1995 |

OTHER PUBLICATIONS

International Search Report and Written Opinion dated Jul. 7, 2020 (corresponding to PCT/US2020/030730).

* cited by examiner

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

A combined blade guide and exchange tool, include a blade guide tool having a lower end and an upper end and a plurality of frame rails supporting a pair of lower collet housings at a lower end of the blade guide tool. A pair of fuel support grapple actuating rods are supported between the plurality of frame rails and have a first end engaging a pair of collets within the pair of lower collet housings and a second end disposed at the upper end of the blade guide tool. A blade exchange tool is releasably mounted to the upper end of the blade guide tool and includes a pair of upper collets for engaging the pair of fuel support grapple actuating rods. The blade exchange tool further including a slider and hook assembly attached to a cable guided by the blade exchange tool and adapted for engaging a control rod.

7 Claims, 17 Drawing Sheets

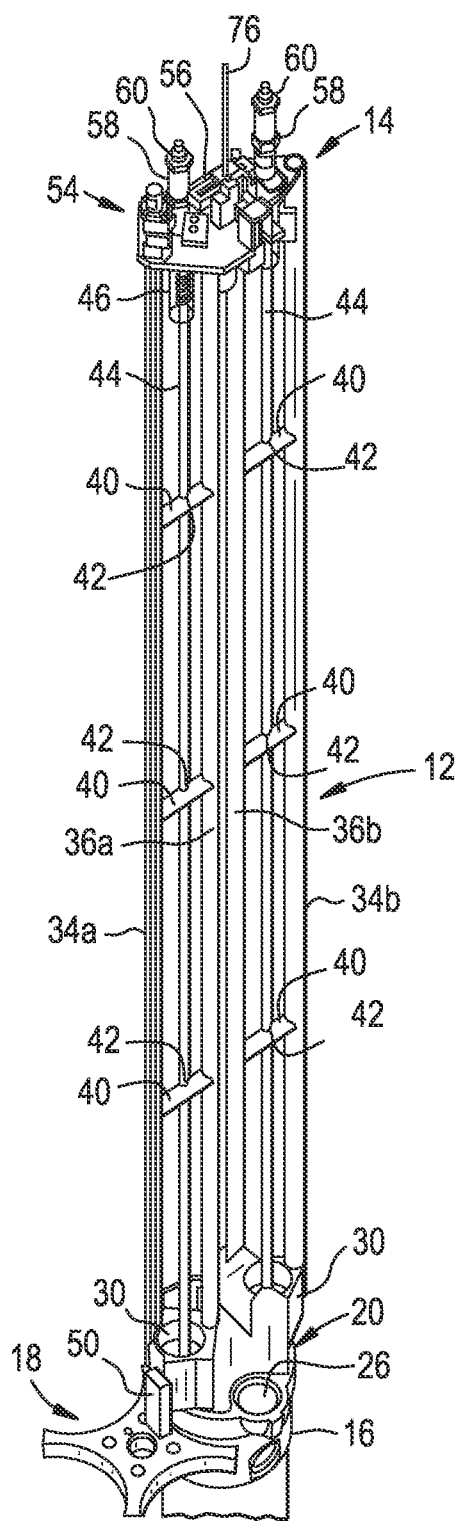
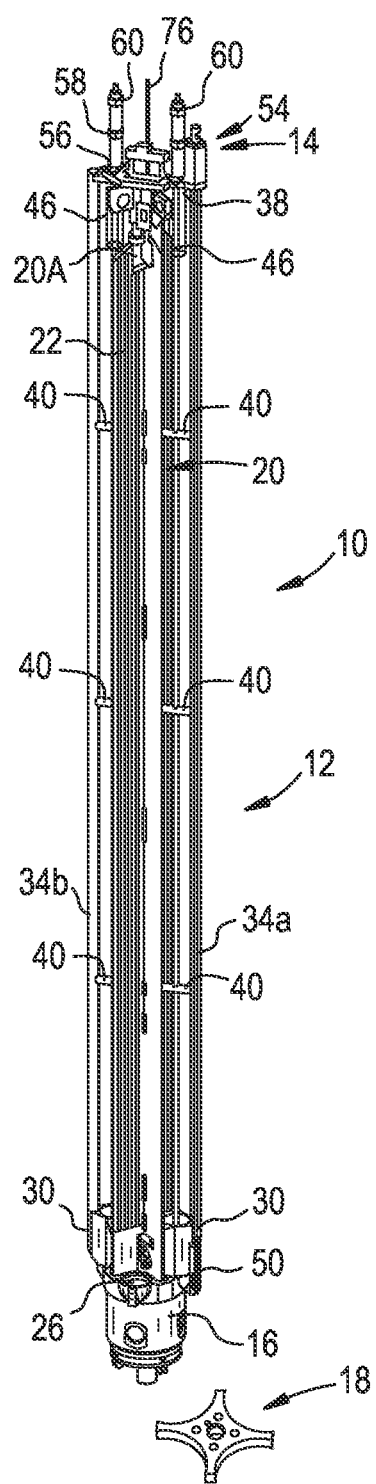

BOILING WATER REACTOR BLADE GUIDE AND EXCHANGE TOOL

BACKGROUND

Field

The present disclosure relates to a boiling water reactor blade guide and exchange tool.

Description of Related Art

This section provides background information related to the present disclosure which is not necessarily prior art.

The control rods in a boiling water reactor contain an absorbent material that when positioned in the reactor core can be used to slow the fission rate of the nuclear fuel. However, the absorbent material is subject to degradation after extended use. Therefore, it is periodically necessary to replace the control rods. In order to remove a control rod from its core location, or cell, it is necessary to provide access to the control rod by removing the fuel and the fuel support associated with the control rod to be removed. It is also necessary to disconnect the control rod from its drive. Tools commonly used to remove the fuel include the fuel grapple and a blade guide which supports the control rod while two of the four fuel bundles are being removed. A control rod unlatching tool is used to disconnect the control rod from its drive. Tools used to remove and/or replace the control rods include a grapple for lifting the fuel support and a grapple for lifting the control rod. These can be separate tools or their functions combined into one tool. The fuel support and control rod are lifted out of their cell and a new control rod and the same fuel support are placed back in the cell. The new control rod is reconnected to the drive without need of tools. A blade guide is placed in the cell and the control rod is then inserted to allow for fuel installation. Two fuel bundles are then placed in the cells next to the blade guide. The blade guide is then removed and two additional fuel bundles are installed in the locations of the vacated blade guide, to complete the control rod and fuel replacement for that cell.

SUMMARY

This section provides a general summary of the disclosure, and is not a comprehensive disclosure of its full scope or all of its features.

The present disclosure provides a blade guide and exchange tool which is comprised of two separate tools: the blade guide tool and the blade exchange tool which, when combined, form the blade guide and exchange tool. The blade guide tool seats on the fuel support and extends up through the top guide. The blade guide tool is used to support a control rod while moving fuel in and out of the cell. In addition to the guiding features, the blade guide tool contains the fuel support grapple that is actuated via a rod that extends from the grapple to the top of the blade guide tool. The rod is actuated by the blade exchange tool after it is mated to the blade guide tool. The blade guide tool also contains a spring-loaded extension rod, extending the full length of the tool, that is in line with the core support alignment pin commonly called the 315 pin. When the blade guide seats on the fuel support, this extension rod contacts the 315 pin causing the rod to lift. The lifted rod engages a mechanism on the blade exchange tool which opens two air switches. The open air switches allow airflow to the fuel support grapple cylinders therefore allowing for operation of the fuel support grapple. When the fuel support is lifted off the core plate, the spring-loaded extension rod loses contact with the 315 pin which causes it to move down. When the rod is down, it disengages from the mechanism on the blade exchange tool which causes the valves to close and disables actuation of the fuel support grapple.

Initially, two of the four fuel bundles in the cell of the control rod to be replaced are removed using the fuel grapple. The blade guide is then installed in the removed fuel locations to support the inserted control rod as the remaining two fuel bundles are removed from the cell. The control rod can now be fully retracted to its back-seated position, as there is no fuel remaining in the cell. The blade exchange tool is connected to an air supply hose and to a hoist via a 12-foot cable attached to the control rod grapple. The blade exchange tool is then lowered onto the blade guide tool and connected to it. The blade exchange tool contains a handle latch, fuel support grapple actuators, a control rod grapple, and air switches to control airflow to the fuel support grapple actuators. When the blade guide and blade exchange tools are connected and grappled together, the tool is referred to as the blade guide and exchange tool.

When the connection of the two tools is made, the control rod grapple engages the center tubes of the blade guide tool, which act as a guide for the grapple to keep it centered in the cell as it is lowered approximately 10 feet to engage the control rod handle. With the blade guide seated on the fuel support and on the 315 pin, the control rod grapple is lowered onto the control rod handle. Air is then supplied to the tool to grapple the control rod and fuel support. The hoist is raised to lift the control rod into the tool until the control rod grapple contacts the underside of the blade guide handle. At this point, raising the hoist further will also lift the blade guide, the exchange tool, and the fuel support. The tool and components are lifted out of the cell, via the hoist, and transported to the exchange area. The control rod is then lowered and seated in the exchange container. Air is supplied to the disengage (or open) side of the exchange tool to disengage the control rod grapple. The control rod grapple air supply (engage and disengage) bypass the air switches and therefore will always operate regardless of being on or off the 315 pin. The disengage action will not actuate the fuel support grapple since the blade guide tool is not engaged on the 315 pin. When off the 315 pin, the air switch is closed preventing airflow to the fuel support grapple. At this point, the control rod is seated in the container, the control rod grapple is disengaged from the control rod handle, and the fuel support is still grappled by the tool. The fuel support can now be lifted off the spent control rod, by raising the hoist, and placed onto a new control rod located in another storage container. The new control rod is grappled by the hook, lifted into the tool, and then out of the storage container. The control rod and fuel support are transported back to the core and reinstalled in the cell. After the fuel support and control rod are seated in the guide tube and the fuel support has engaged the 315 pin, both the fuel support and control rod can be released. The blade exchange tool can be lifted off the blade guide tool. The blade guide tool remains to allow for blade insertion and loading of two fuel bundles into the cell. After this step, the blade guide is removed via the fuel grapple, and two additional fuel bundles can be loaded in its place.

According to an aspect of the present disclosure, a combined blade guide and exchange tool includes a blade guide tool having a lower end and an upper end and a plurality of frame rails supporting a pair of collet housings at a lower end of the blade guide tool. A pair of fuel support grapple actuating rods are supported between the plurality of frame rails and have a first end engaging a pair of collets within the pair of collet housings and a second end disposed at the upper end of the blade guide tool. A blade exchange tool is releasably mounted to the upper end of the blade guide tool and includes a pair of upper collets for engaging the pair of fuel support grapple actuating rods. The blade exchange tool further includes a trolley and hook assembly attached to a cable guided by the blade exchange tool and adapted for engaging and lifting a control rod.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a perspective view of a blade guide and exchange tool assembled on a fuel support and having a control rod fully retracted according to the principles of the present disclosure;

FIG. 2 is a perspective view of the blade guide and exchange tool assembled on a fuel support and having the control rod fully extended;

Corresponding reference numerals indicate corresponding parts throughout the several views of the drawings.

DETAILED DESCRIPTION

Figure 3A:
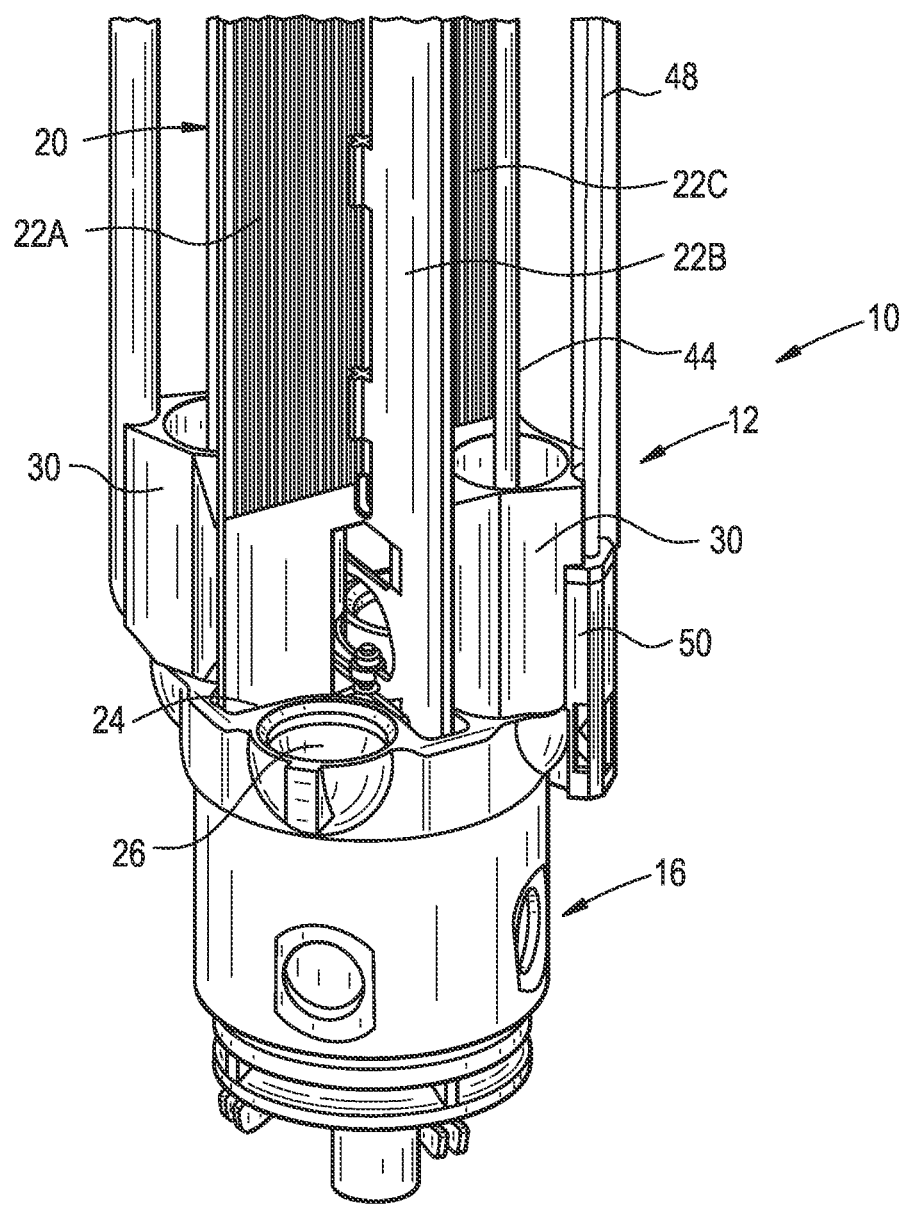
FIG. 3A is a close-up perspective view of the bottom of the blade guide and exchange tool assembled on a fuel support.
Figure 3B:
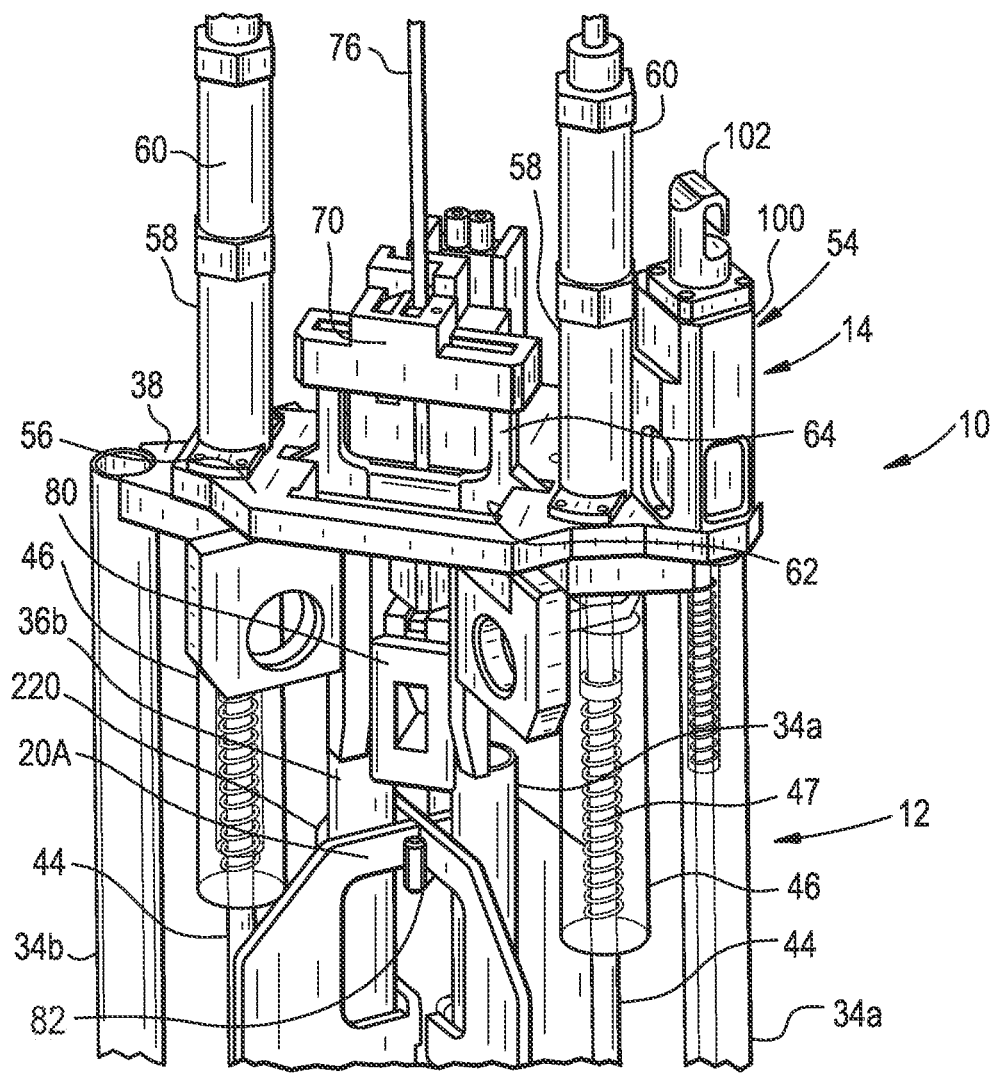
FIG. 3B is a close-up perspective view of the top of the blade guide and exchange tool.
Figure 4A:
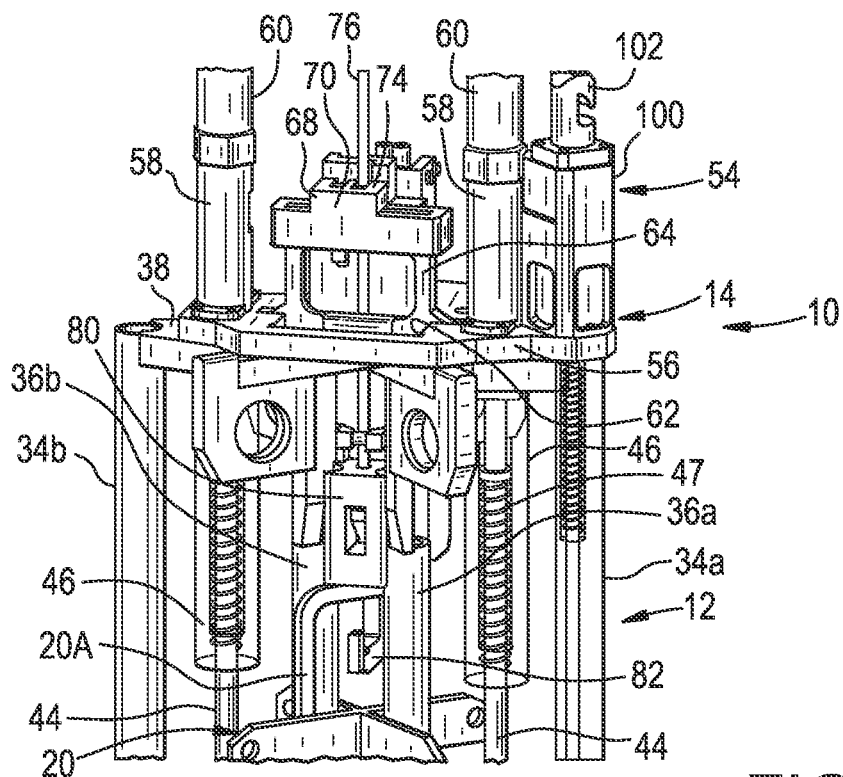
FIG. 4A is a close-up perspective view of the top of the blade guide and exchange tool with the hook being engaged to the handle of the control rod in its extended position.
Figure 4B:
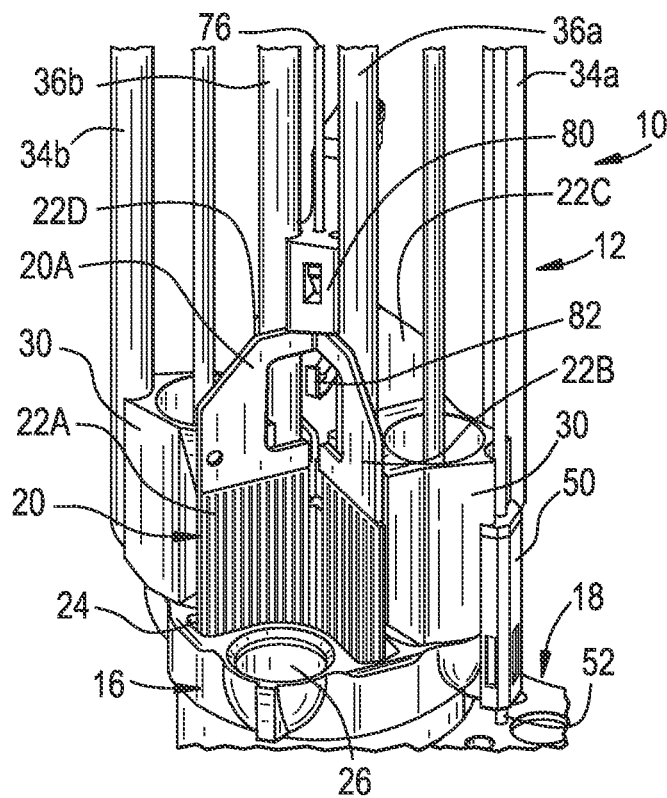
FIG. 4B is a close-up perspective view of the bottom of the blade guide and exchange tool with the hook being engaged to the handle of the control rod in its retracted position.
Figure 5:
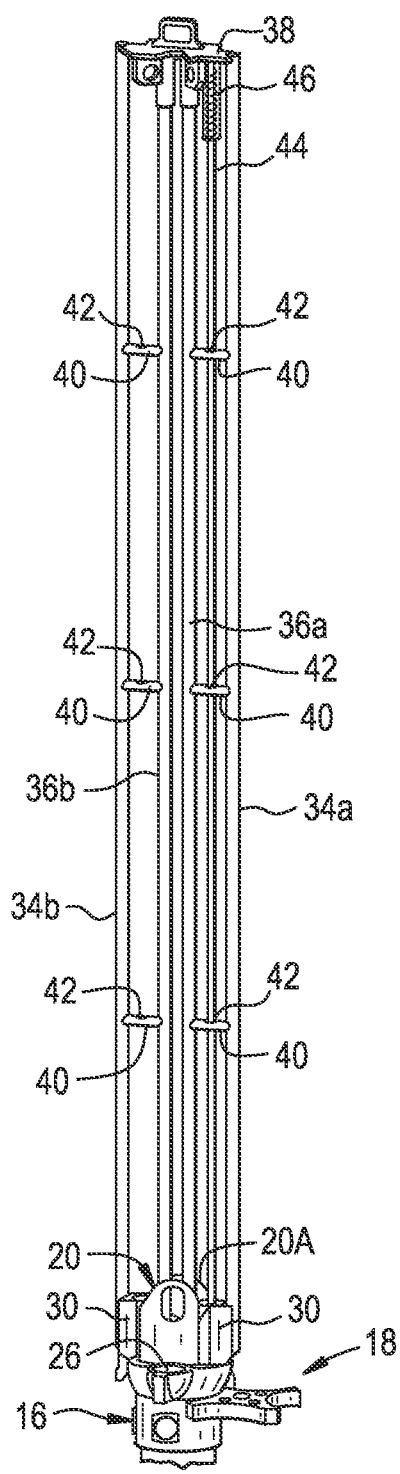
FIG. 5 is a perspective view of the blade guide tool according to the principles of the present disclosure.
Figure 6:
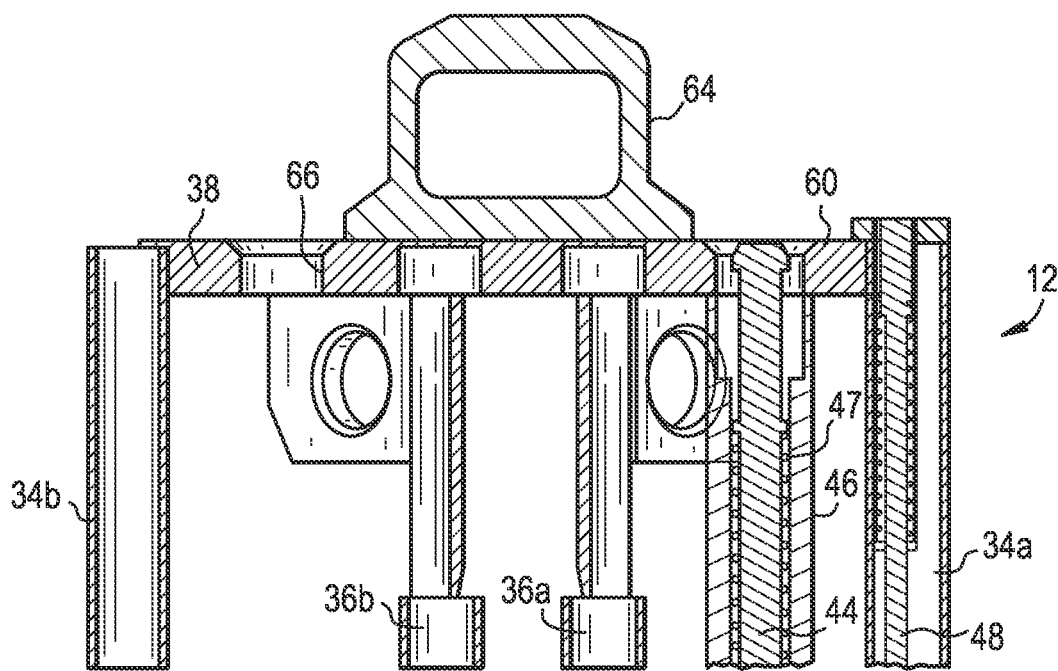
FIG. 6 is a partially cutaway view of the top of the blade guide tool according to the principles of the present disclosure.
Figure 7:
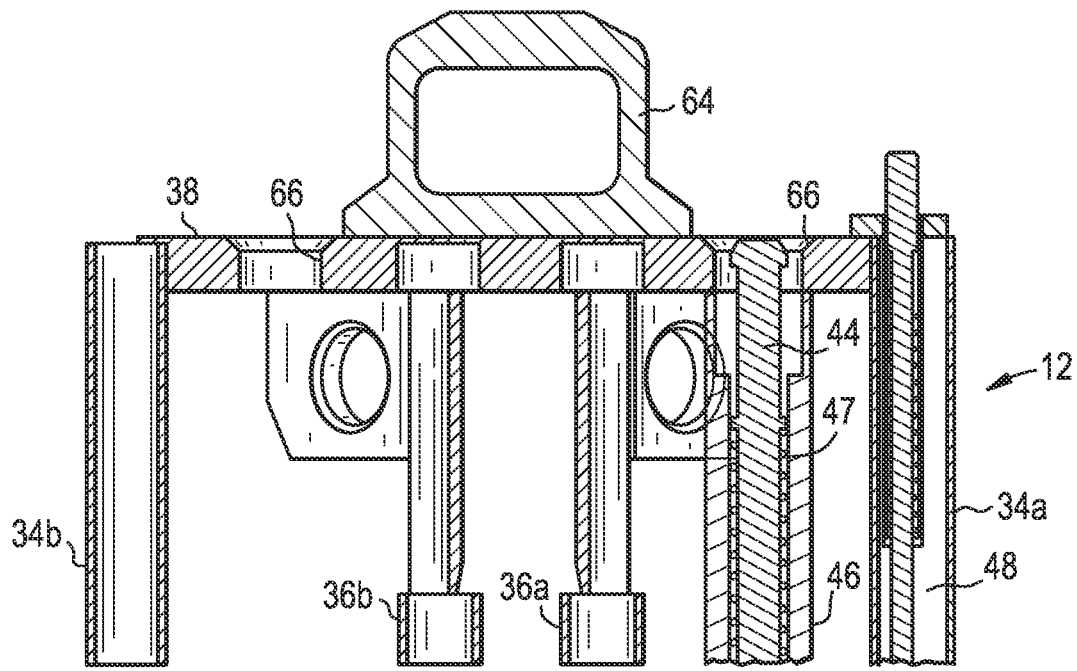
FIG. 7 is a partially cutaway view of the top of the blade guide tool according to the principles of the present disclosure with the core support pin actuating rod shown in a retracted position.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a blade guide and exchange tool 10 is shown including a blade guide tool 12 and a blade exchange tool 14 removably assembled to the blade guide tool 12. In FIGS. 1, 2, 3A and 4B, a base 12a of the blade guide 12 is shown engaged with a fuel support 16 which is disposed next to a core support 18. As best shown in FIGS. 3A, 3B, a control rod 20 includes a plurality of blades 22A-22D formed in a cruciform shape and extending through a cruciform passage 24 in the fuel support 16. As is known in the art, the control rod 20 contains an absorbent material that when positioned in the reactor core can be used to slow the fission rate of the nuclear fuel. The fuel support 16 includes four pockets 26 each for receiving the base of a fuel bundle (not shown).

Figure 17:
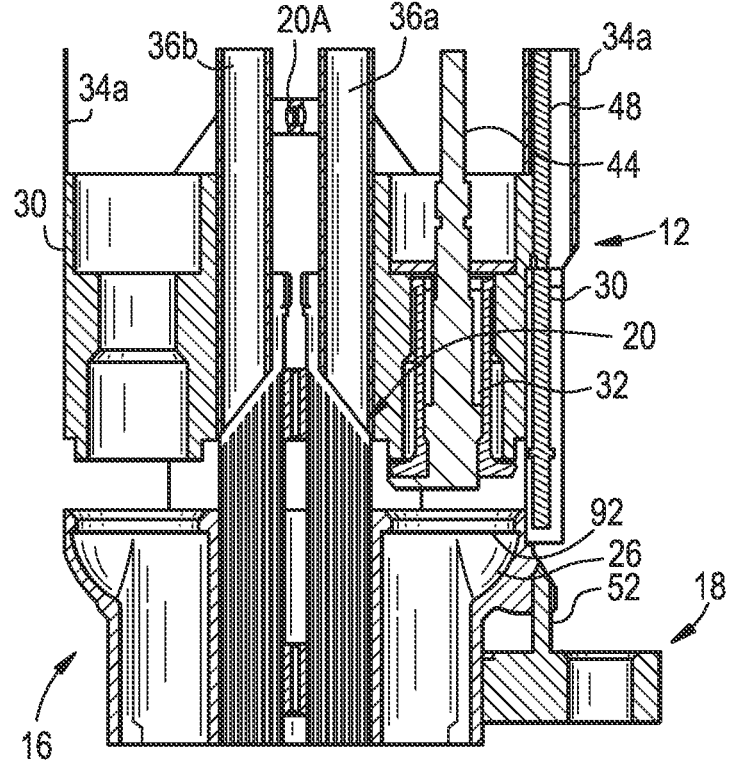
FIG. 17 is a partial cutaway view of the collet housing and collet assembly used for engaging the fuel support.
Figure 18:
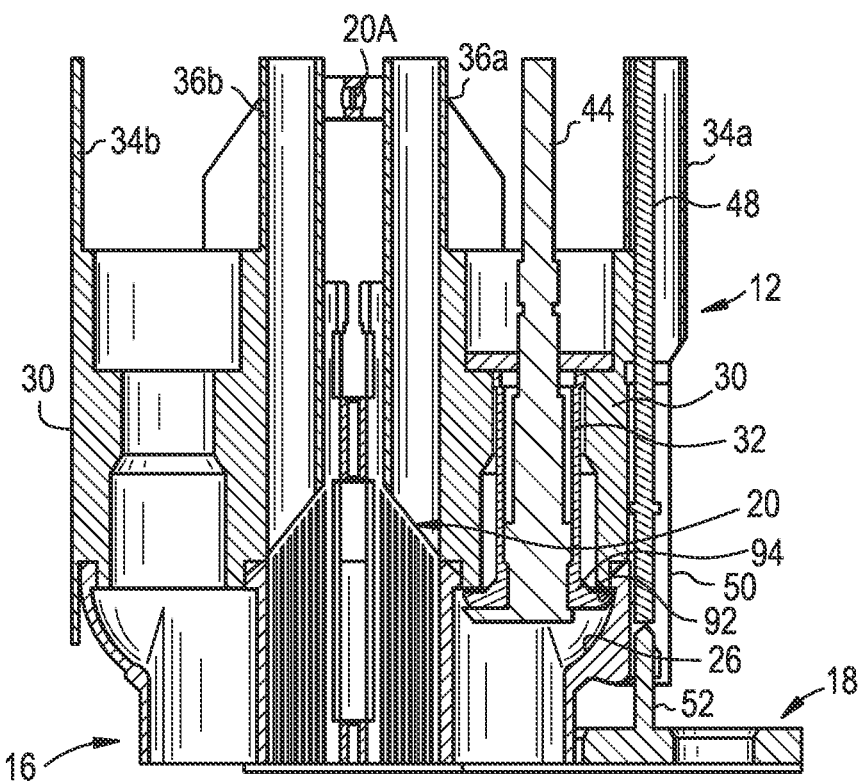
FIG. 18 is a partial cutaway view of the collet housing and collet assembly during an engagement of the fuel support.
Figure 19:
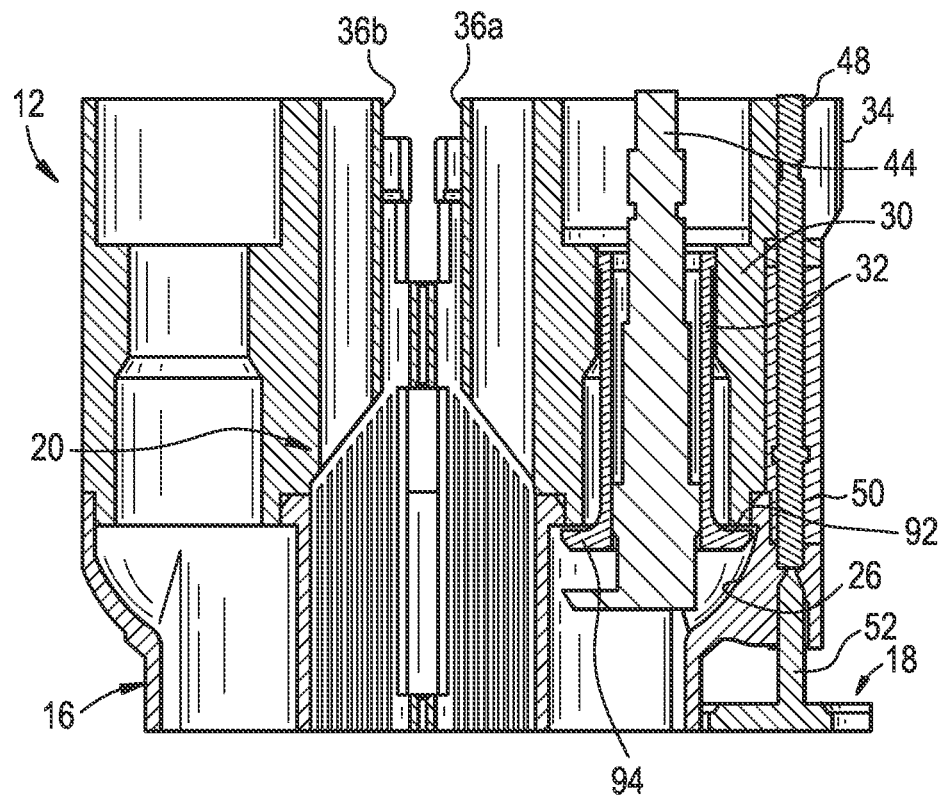
FIG. 19 is a partial cutaway view of the collet housing and collet assembly after full engagement of the fuel support.
Figure 20:
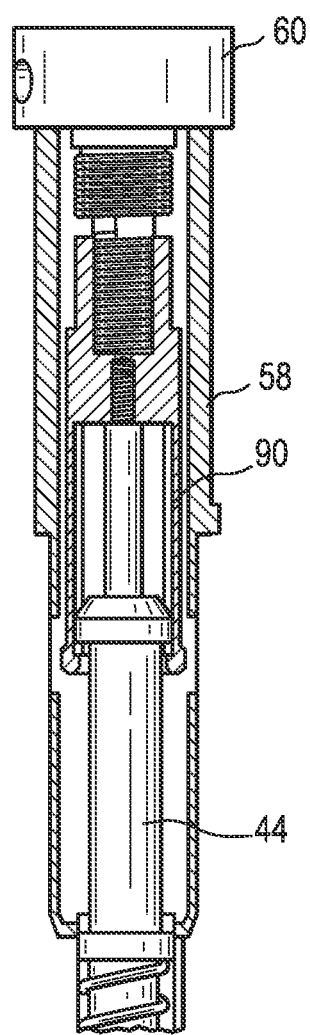
FIG. 20 is a cross-sectional view of the upper collet housing according to the principles of the present disclosure.

The base 12a of the blade guide tool 12 includes a pair of collet housings 30 which each house a collet assembly 32, best shown in FIGS. 17-19. The pair of collet housings 30 are connected to a pair of outer frame rails 34a, 34b and a pair of inner frame rails 36a, 36b. A top plate 38 is attached to the tops of the outer frame rails 34a, 34b and the inner frame rails 36a, 36b. A plurality of brace plates 40 are disposed between corresponding ones of the outer frame rails 34a, 34b and the inner frame rails 36a, 36b. The brace plates 40 each include a guide hole 42 extending there through. A pair of fuel support grapple actuating rods 44 extend through each of the guide holes 42 of the brace plates 40 and have a bottom end that engages a collet assembly 32 within the pair of collet housings 30 and have a top end that is disposed in a corresponding guide housing 46 extending below the top plate 38. A spring 47 is disposed in the guide housing 46 for biasing the fuel support grapple actuating rods 44 in an upward direction.

A core support pin actuating rod 48 is disposed within, and extends along a length of one of the outer frame rails 34a. The core support pin actuating rod 48 has a lower end that is guided within a guide housing 50 and engaged by a core support pin 52 (best shown in FIGS. 17-19) when the blade guide tool 12 is properly seated in the fuel support 16. The core support pin 52 extends upward from the core support 18 and when engaged by the core support pin actuating rod 48, causes the core support pin actuating rod 48 to move upward in order to cause activation of an air switch actuator assembly 54 of the blade exchange tool 14, as will be described in further detail herein.

Figure 8:
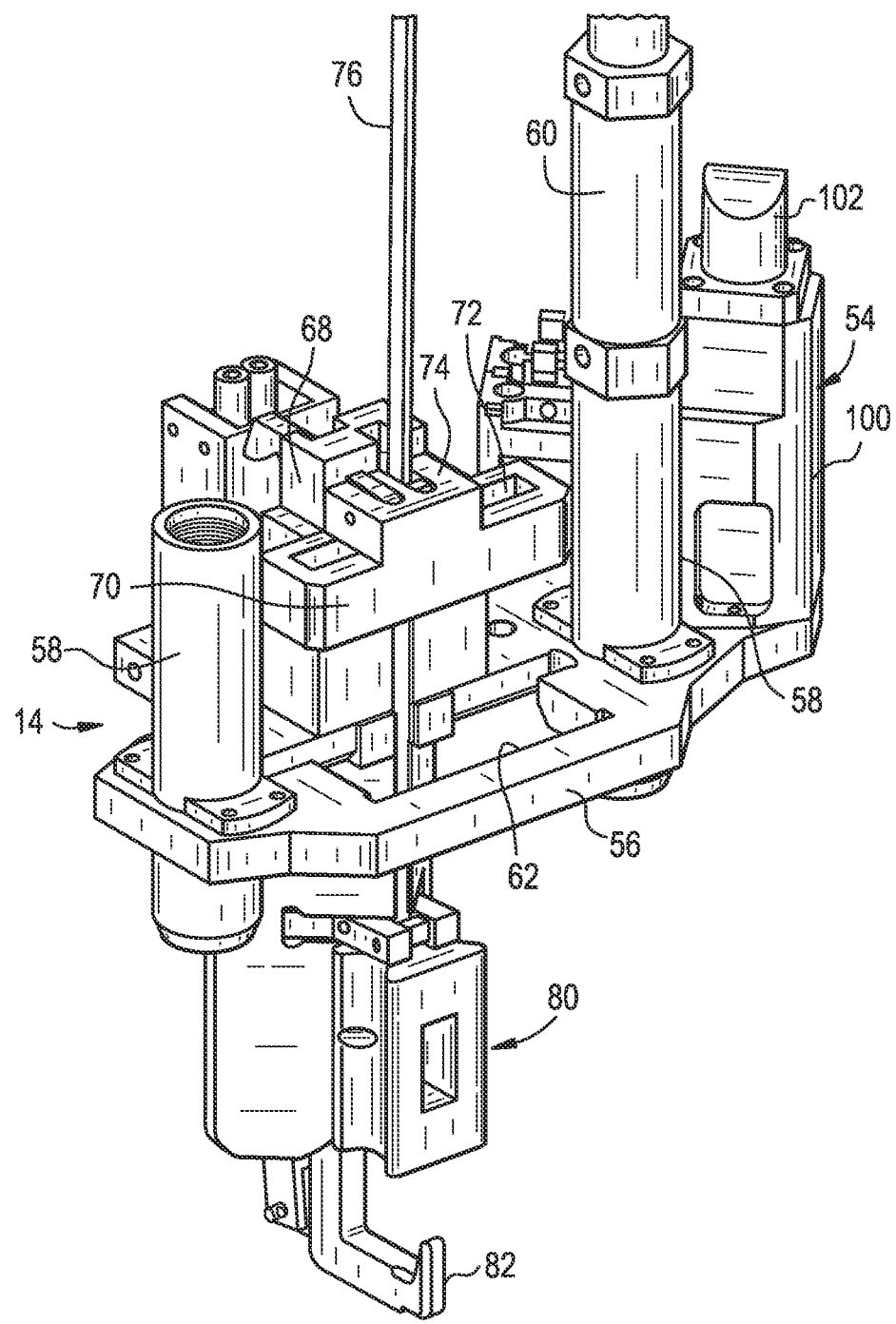
FIG. 8 is a front perspective view of the blade exchange tool according to the principles of present disclosure.
Figure 11:
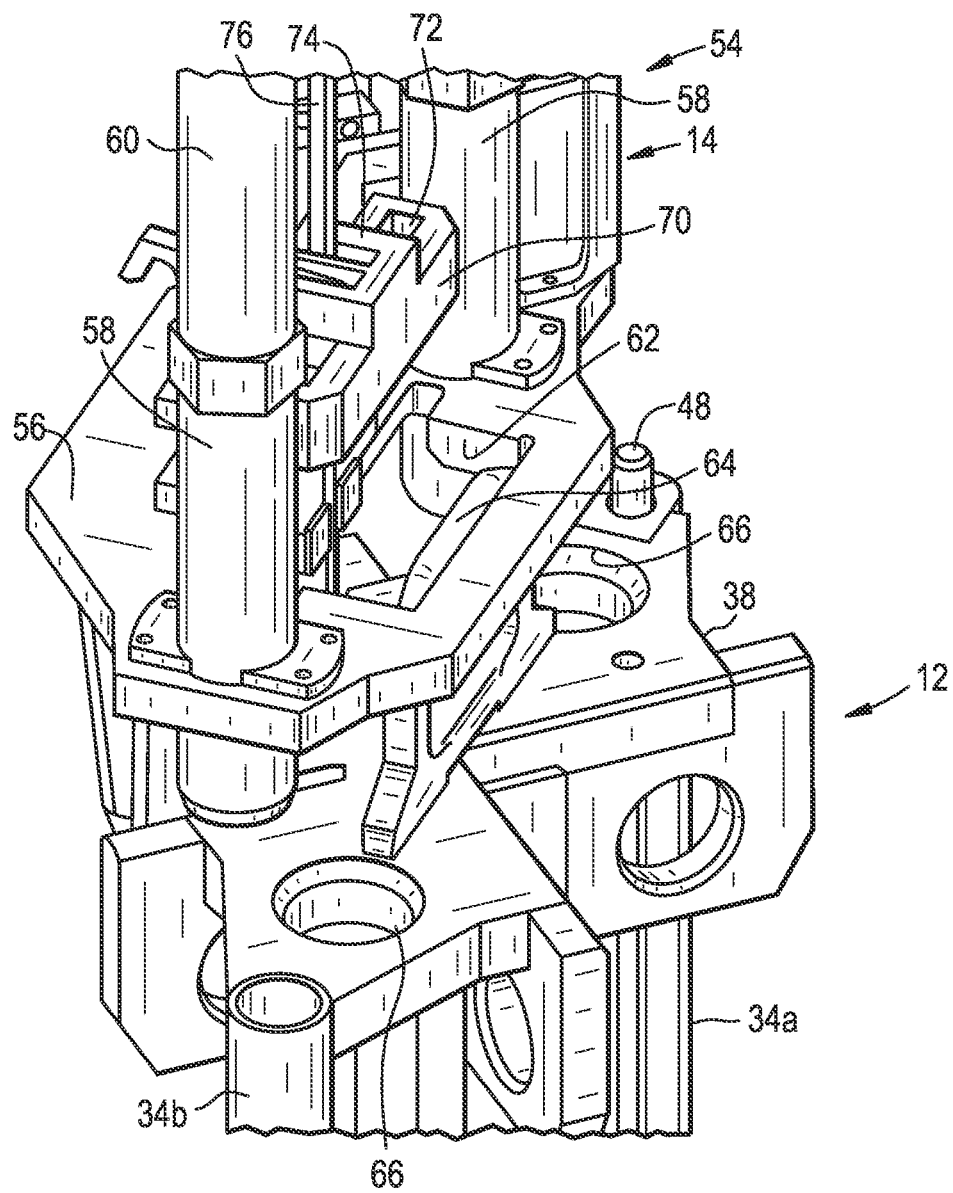
FIG. 11 is a top perspective view showing the blade exchange tool being assembled to the blade guide tool according to the principles of the present disclosure.
Figure 12:
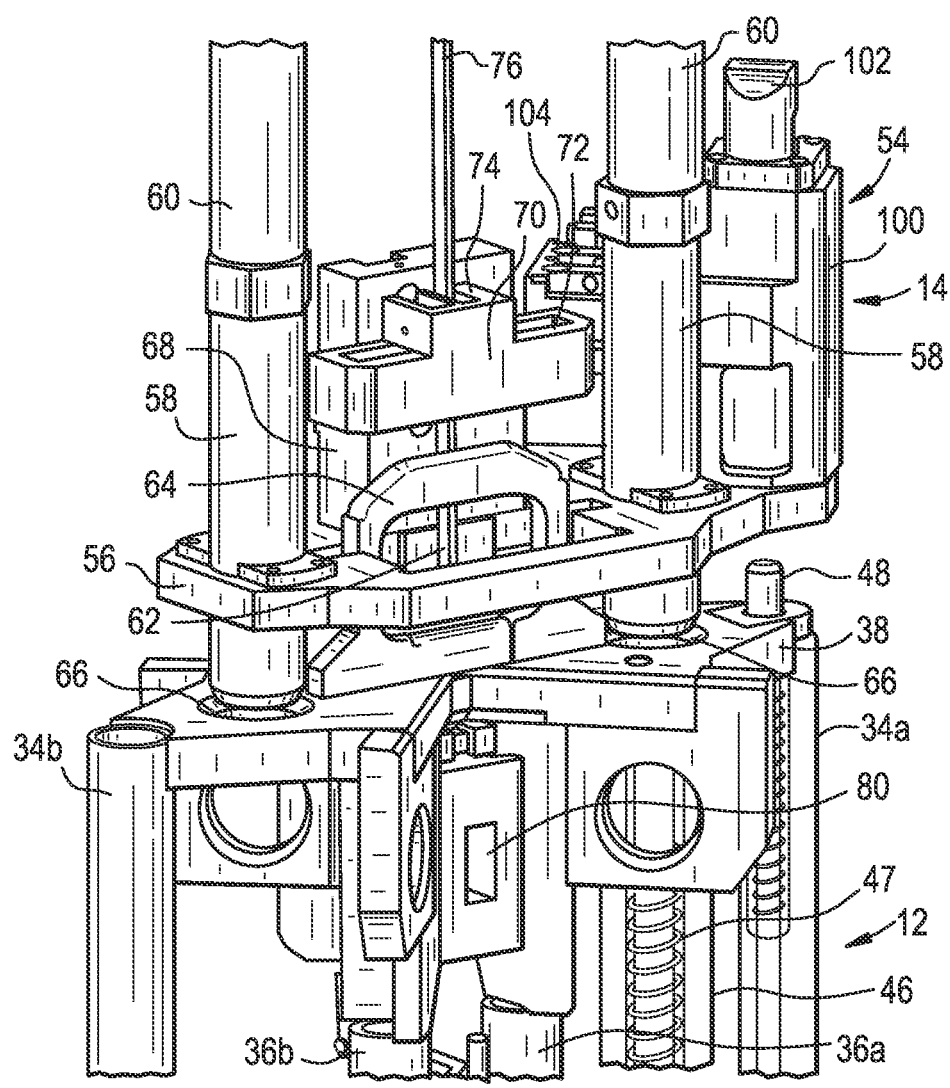
FIG. 12 is a side perspective view showing the blade exchange tool being assembled to the blade guide tool according to the principles of the present disclosure.
Figure 13:
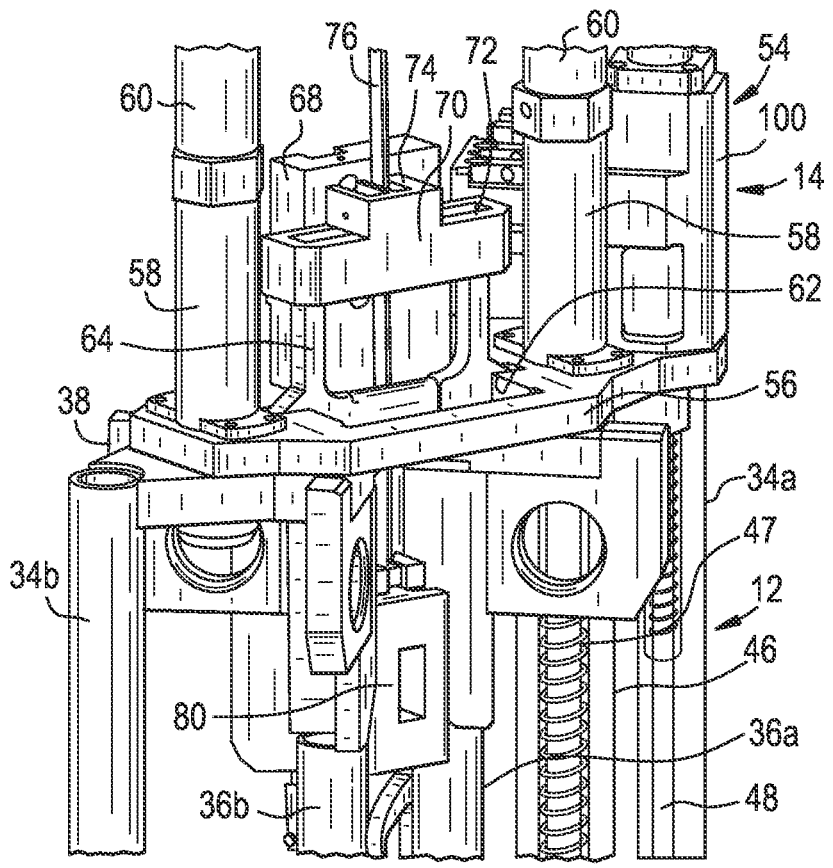
FIG. 13 is a side perspective view showing the blade exchange tool fully assembled to the blade guide tool according to the principles of the present disclosure.
Figure 14:
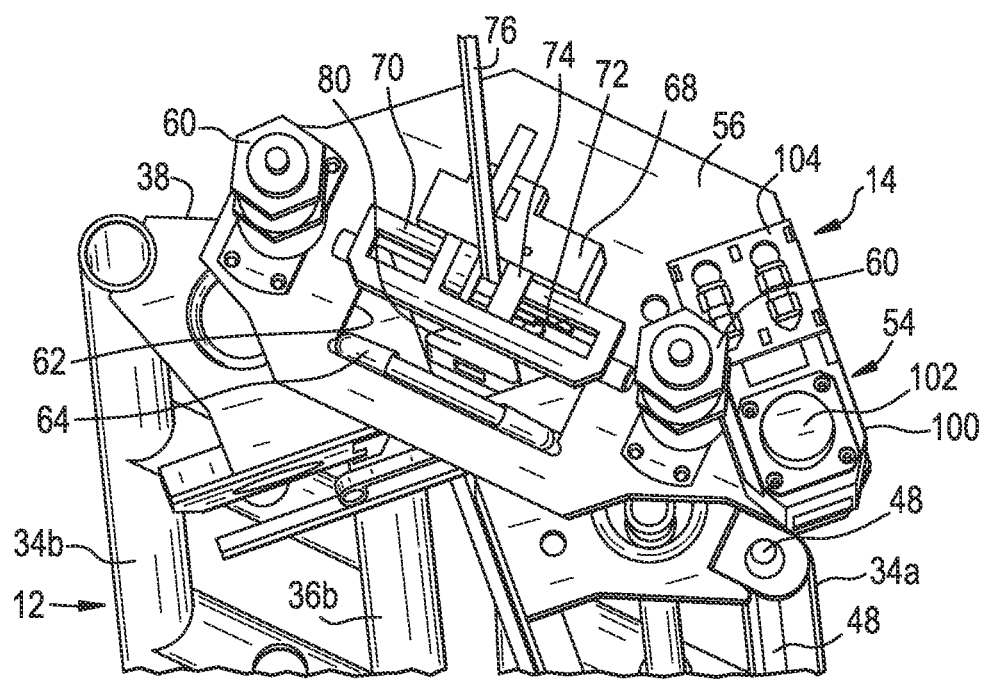
FIG. 14 is a top perspective view showing the clearance for the slider of the blade exchange tool being assembled to the blade guide tool according to the principles of the present disclosure.
Figure 15:
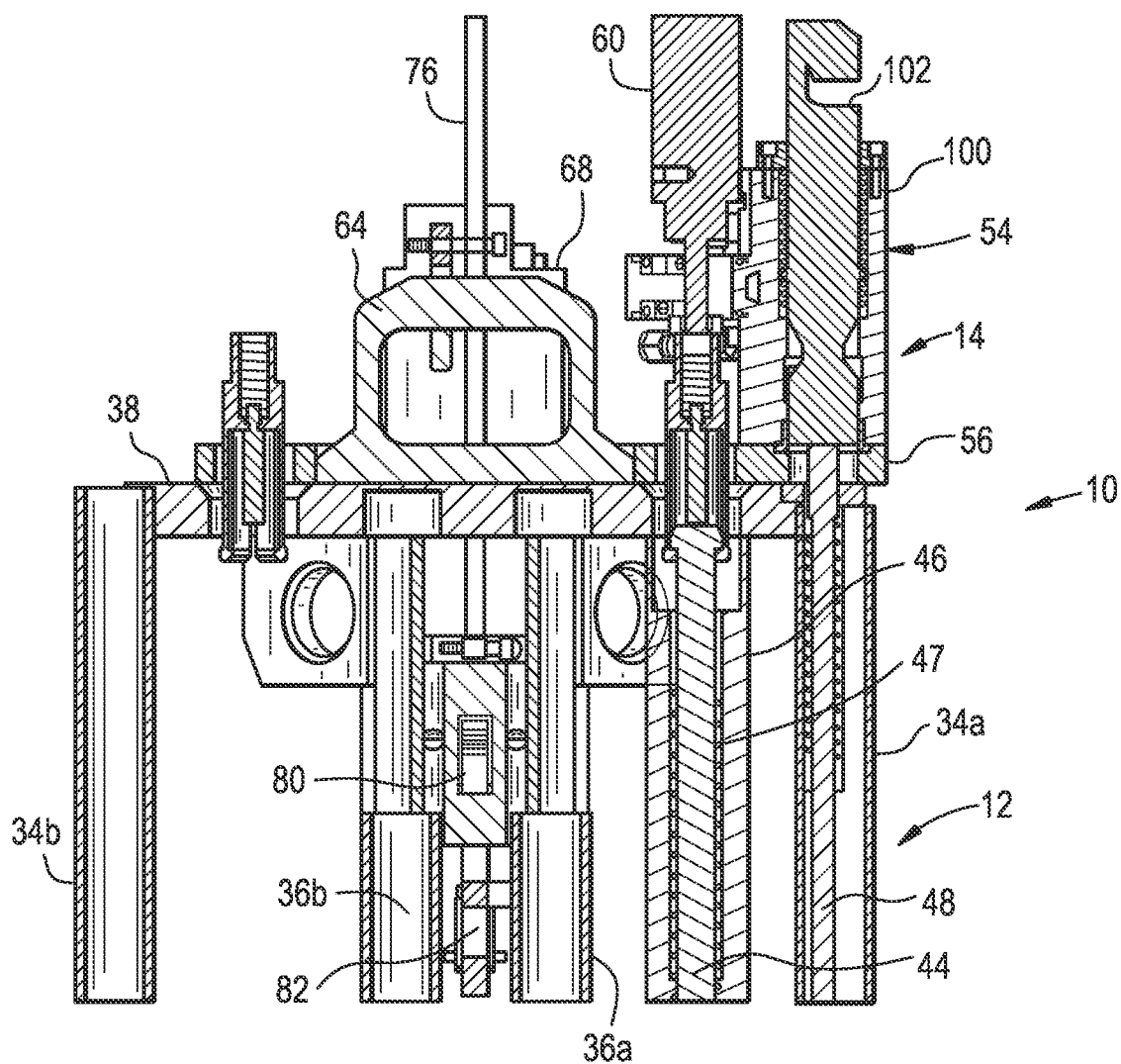
FIG. 15 is a side plan view of the top of the blade guide and exchange tool.

As best shown in FIG. 8, the blade exchange tool 14 includes a base plate 56 to which the air switch actuator assembly 54 is mounted along with a pair of upper collet housings 58. A pair of air cylinders 60 are mounted on each of the collet housings 58. The baseplate 56 includes an opening 62 (best shown in FIG. 8) therein for receiving a U-shaped handle 64 extending from the top plate 38 of the blade guide tool 12. The upper collet housings 58 are each mounted in additional holes in the baseplate 56 and extend below the baseplate 56 and are adapted to be received in corresponding holes 66 (as shown in FIGS. 11-13) in the top plate 38 of the blade guide tool 12.

Figure 9:
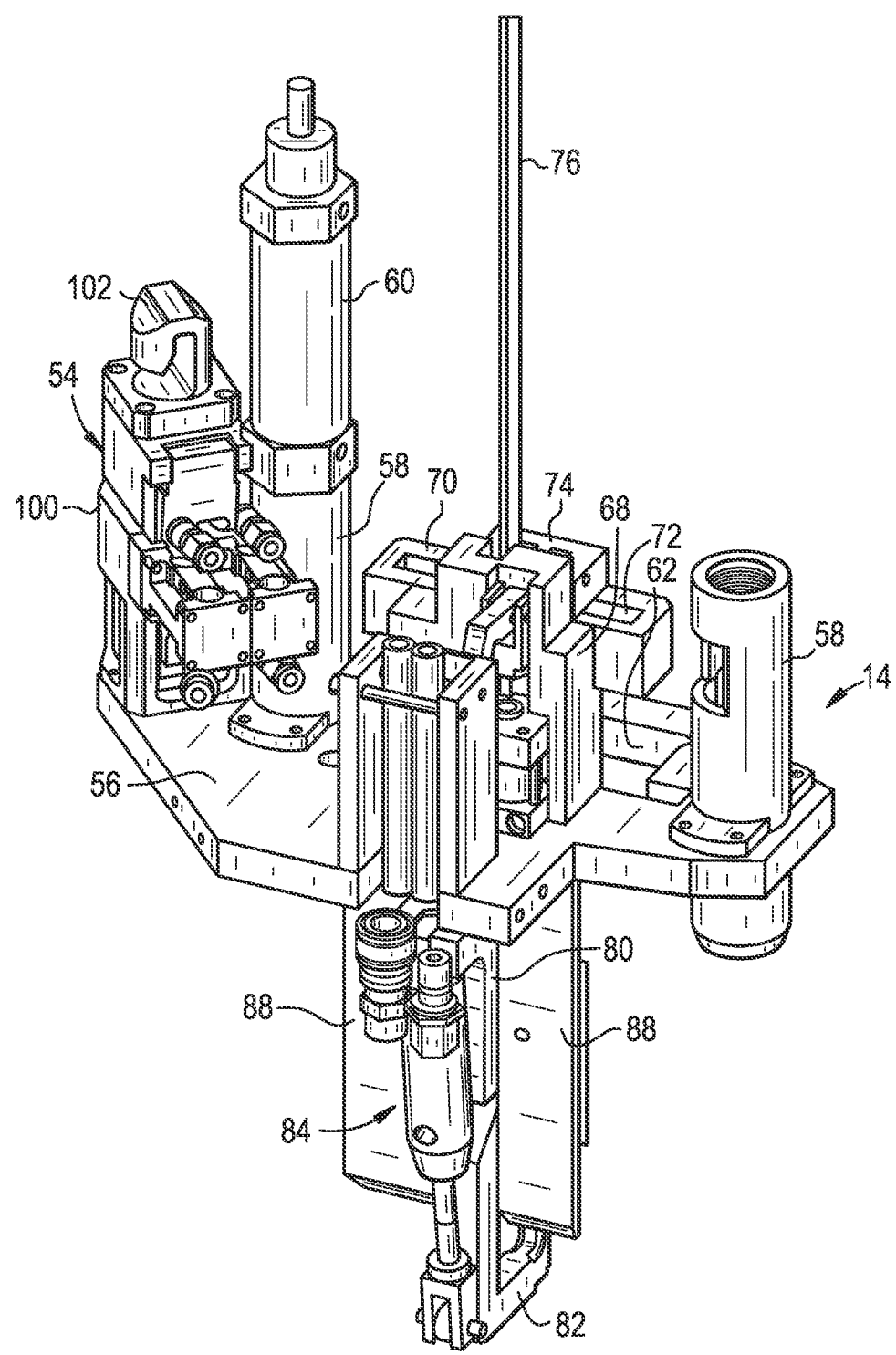
FIG. 9 is a rear perspective view of the blade exchange tool shown in FIG. 8.

As shown in FIGS. 8 and 9, a mounting structure 68 is mounted to the baseplate 56 adjacent to the opening 62 and includes a handle engagement bracket 70 mounted thereto. The handle engagement bracket 70 includes a slot 72 for receiving the handle 64 of the blade guide tool 12 and also defines a cable guide 74 for receiving and guiding a cable 76 there through. The cable 76 is attached to a slider 80 which supports an engagement hook 82 and pneumatic hook actuator assembly 84. The slider 80 is engageable with the inner rails 36a, 36b to traverse along the length of the inner rails 36a, 36b. The slider 80 can be lowered by the cable 76 along the inner rails 36a, 36b and can bring the hook 82 into engagement with an upper handle 20A of the control rod 20. The hook 82 can be pneumatically engaged by the cylinder of the hook actuator assembly 84 and the cable 76 can be utilized to raise the control rod 20. As best shown in FIG. 9, a pair of downwardly protruding guide plates 88 extend below the baseplate 56 of the blade exchange tool 14 to guide the slider 80 into its transition between the inner rails 36a, 36b.

Figure 10:
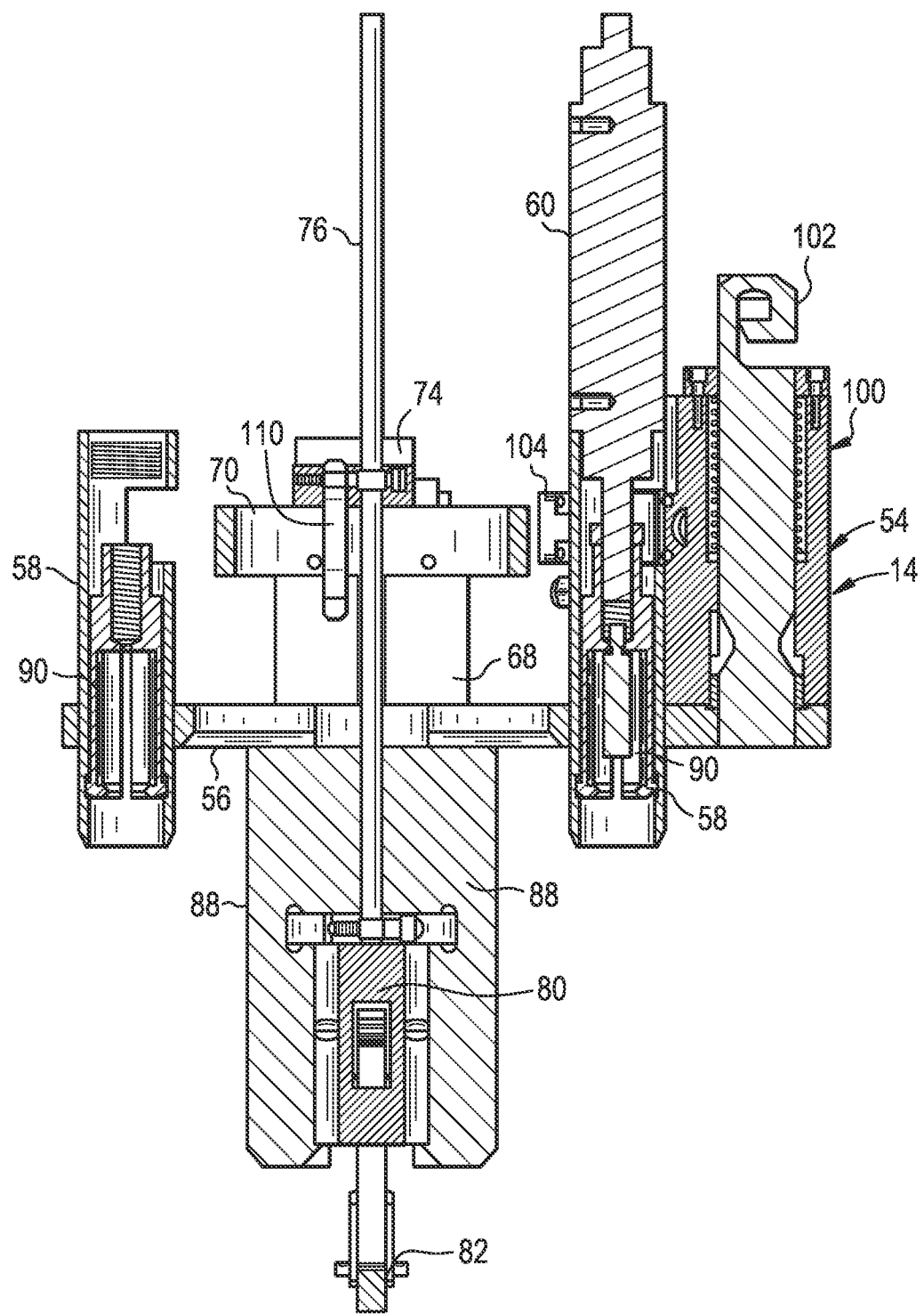
FIG. 10 is a front plan view of the blade exchange tool shown in FIG. 8.

As best shown in the partially cutaway view of FIG. 10, each of the upper collet housings 58 include an upper collet 90 disposed within the housing and engaged with the air cylinder 60 for activation. The upper collets 90 are engageable with the upper end of the fuel support grapple actuator rods 44 to latch onto the actuating rods 44 and to press the actuating rods 44 downward into the lower collet housings 30 as shown sequentially in FIGS. 17-19, for engaging the lower collets 32 to spread laterally outward to engage an inwardly extending lip 92 surrounding the fuel bundle pockets 26 of the fuel support 16 by a hook portion 94 on the ends of each collet section 32. Accordingly, the lower collets 32 are engageable with the fuel support 16 in order to lift the fuel support 16 out of the core along with the control rod 20.

Figure 16:
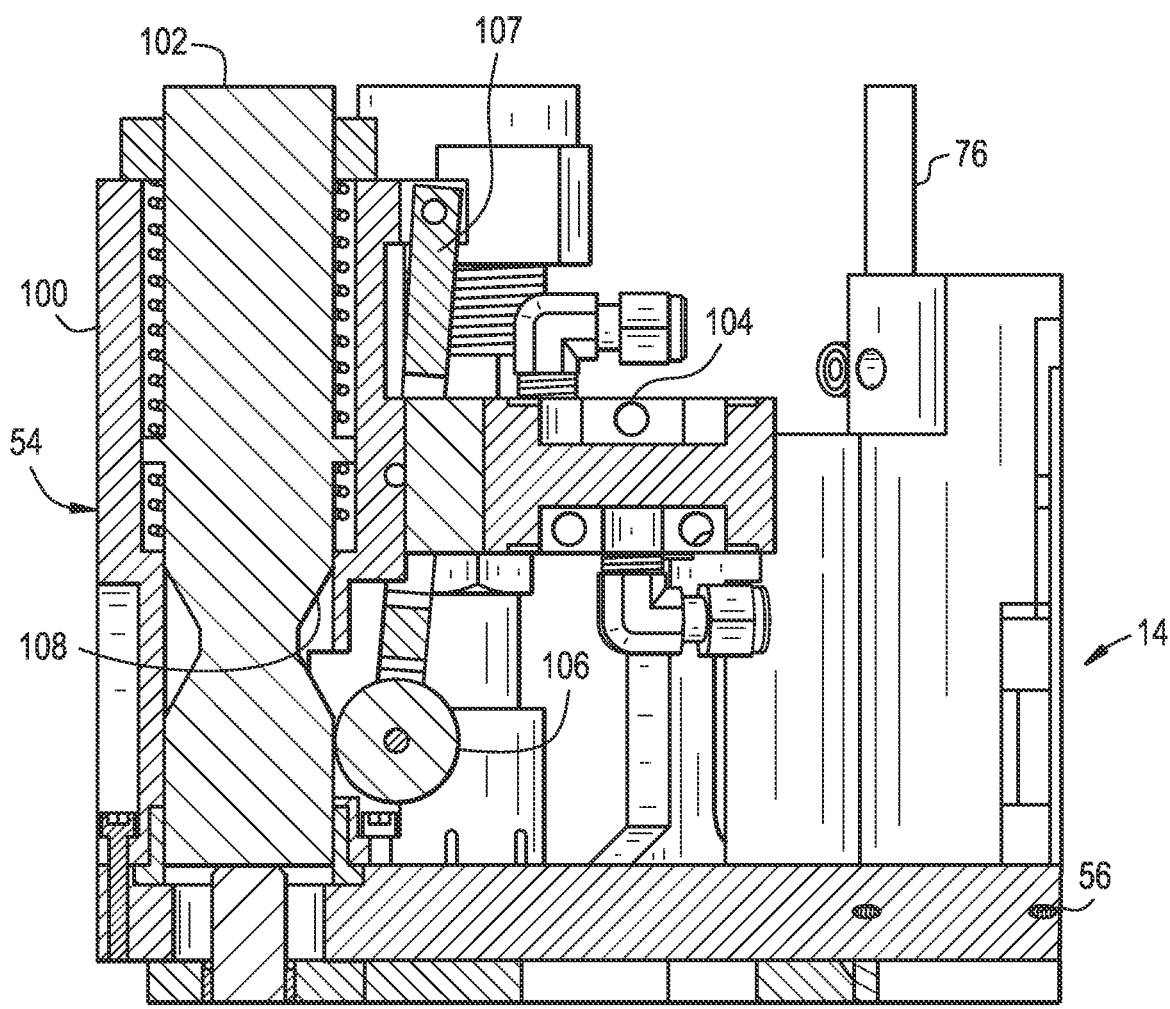
FIG. 16 is a detailed view of the air switch actuator assembly and the air switch of the blade guide and exchange tool.

As mentioned above, the core support 18 includes a core support pin 52 which causes the core support pin actuating rod 48 to move upward in order to cause activation of an air switch actuator assembly 54 of the blade exchange tool 14. The air switch actuator assembly 54 includes a housing 100 which supports a core support pin flag 102. The core support pin flag 102 is engaged with an upper end of the core support pin actuating rod 48 which presses the core support pin flag 102 upward when the core support pin actuating rod 48 is pushed upward by engagement with the core support pin 52 when the blade guide tool is properly engaged with the fuel support 16. As shown in FIG. 16, an air switch 104 is mounted to the air switch actuator assembly 54 and includes a cam follower 106 and switch arm 107 engaged with a cam surface 108 on the core support pin flag 102. As the core support pin flag 102 is pushed upward, the switch arm 107 of the air switch 104 is actuated to allow delivery of pneumatic air pressure to a latch that latches the blade exchange tool 14 to the blade guide tool 12 and, when not actuated, to prevent delivery of pneumatic air pressure to a release side of the collet air cylinders 60. As best shown in FIG. 10, a blade guide hook 110 is mounted on the mounting structure 68 for securing the handle engagement bracket 70 to the handle 64 of the blade guide tool 12 to prevent separation there from. The blade guide hook 110 can be actuated manually or by a pneumatic actuator.

When the cable 76 is lowered to allow the slider 80 and hook 82 to be positioned relative to the handle 20a of the core 20, the cylinder of the hook actuator assembly 84 can be activated to engage the hook 82 to the handle 20a.

During operation, the blade guide and exchange tool 10 is comprised of two separate tools, the blade guide tool 12 and the blade exchange tool 14 which when combined, form the blade guide and exchange tool 10. With two of the fuel bundles removed, the blade guide tool 12 seats on the fuel support 16 and extends up through a top guide of a cell. The blade guide tool 12 is used to support a control rod 20 while moving fuel in and out of the cell. In addition to the guiding features, the blade guide tool 12 contains the fuel support grapple lower collets 32 that are actuated via the actuating rods 44 that extends from the collets 32 to the top of the blade guide tool 12. The actuating rods 44 are actuated by the blade exchange tool 14 after it is mated to the blade guide tool 12. The blade guide tool 12 also contains a spring-loaded pin actuating rod 48 that is in line with the core support alignment pin 52 and extends the full length of the blade guide tool 12. The pin actuating rod 48 is used to operate the air switch 104 of the blade exchange tool 14 to control airflow to the fuel support grapple collets 32 when the pin actuating rod 48 is either engaged, or not engaged, on the alignment pin 52.

The blade guide tool 12 is installed first into the cell of the control rod 20 to be removed. The blade guide tool 12 supports the inserted control rod 20 as the remaining two fuel bundles are removed from the cell and supports the control rod 20 as it is fully retracted to its back-seated position. The blade exchange tool 14 is connected to an air supply hose and to a hoist via a 12-foot cable attached to the control rod grapple 20a. The blade exchange tool 14 is then lowered onto the blade guide tool 12. The blade exchange tool 14 contains a connecting hook 110 to join the blade guide tool 12 and the blade exchange tools 14 together, and a pair of air actuators 60 for the fuel support grapple collets 32. When the blade guide tool 12 and the blade exchange tool 14 are connected and grappled together, the tool 10 is referred to as the blade guide and exchange tool 10. After connection of the two tools 12, 14, the upper collets 58 lock onto the fuel support grapple actuating rods 44 of the blade guide tool 12 to guide the blade exchange tool 14 as it is lowered onto the control rod handle 20a. Air is supplied to the tool 14 to grapple the control rod 20 via hook 82 and fuel support 16 via the lower collets 32. The control rod 20 is then lifted into the tool 10 until the control rod slider 80 contacts the top and of the blade guide and exchange tool 10 at which point the blade guide and exchange tool 10, along with the control rod 20 and fuel support 16 are also lifted.

The tool 10, control rod 20, and fuel support 16 are removed from the cell and transported to the exchange area. The control rod 20 is lowered and seated in an exchange container. The fuel support grapple collets 32 will not release since the tool 10 is not engaged with the core support alignment pin 52 and therefore the air switch 104 is closed preventing airflow to the retract side of the fuel support grapple collets 32. The fuel support 16 can now be lifted off the spent control rod 20 and placed onto a new control rod 20 located in another storage container. The new control rod 20 is grappled by the hook 82, lifted into the tool 10, and then reinstalled in the cell. After the fuel support 16 and control rod 20 are seated in the guide tube, both are released and the blade exchange tool 14 can be lifted off the blade guide tool 12. The blade guide tool 12 remains to allow for blade insertion and loading of two fuel bundles. The core support pin actuating rod 48 is engaged with the core support pin 52 to allow the air release to the air cylinders 60 of the upper collets 90 via the air switch actuator assembly 54. Accordingly, the blade guide tool 12 is then removed via release of the collets 32 and so additional fuel bundles can be loaded.

With the present disclosure, the blade guide function and the control rod exchange function are combined into one tool therefore two in-core alteration steps, the need to remove and reinstall a blade guide.

The present disclosure also provides verification checks (315 pin engagement and fuel support grappling) that are located at the top of the tool (as opposed to other tools which have verifications at the bottom of the tool) and can easily be viewed and verified by an underwater camera. The ease of verification checks saves considerable time in the overall exchange process.

The grid guide is a separate tool used with other control rod exchange tools but is not needed with the blade guide and exchange tool of the present disclosure, as the blade guide portion of the tool serves the grid guide function. This eliminates setup and installation of this tool and therefore saves time and radiation exposure to the worker.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A combined blade guide and exchange tool, comprising:
    a blade guide tool having a lower end and an upper end and a plurality of frame rails supporting a pair of collet housings at a lower end of the blade guide tool, a pair of fuel support grapple actuating rods are supported between the plurality of frame rails and having a first end engaging a pair of collets within the pair of collet housings and having a second end disposed at the upper end of the blade guide tool; and
    a blade exchange tool releasably mounted to the upper end of the blade guide tool and including a pair of upper collets for engaging the pair of fuel support grapple actuating rods, the blade exchange tool further including a slider and hook assembly attached to a cable guided by the blade exchange tool and adapted for engaging and lifting a control rod.

2. The combined blade guide and exchange tool according to claim 1, further comprising:
    a pair of air cylinders connected to respective ones of the pair of upper collets.

3. The combined blade guide and exchange tool according to claim 2, further comprising:
- a fuel support pin actuating rod adapted to engage a pin on a core support, the fuel support pin actuating rod is engageable by an air switch actuating assembly of the blade exchange tool, the air switch actuating assembly being engageable with an air switch of the blade exchange tool, the air switch being activated to prevent airflow to the retract side of the air cylinders of the pair of upper collets.

4. The combined blade guide and exchange tool according to claim 1, wherein the slider and hook assembly includes a hook actuator cylinder.

5. The combined blade guide and exchange tool according to claim 1, wherein the blade exchange tool includes a connecting device for releasably connecting the blade exchange tool to the blade guide tool.

6. The combined blade guide and exchange tool according to claim 1, wherein the blade guide tool includes a top plate at the upper end of the blade guide and the blade exchange tool includes a base plate that is supported on top of the top plate when the blade exchange tool is engaged with the blade guide tool.

7. The combined blade guide and exchange tool according to claim 1, wherein the pair of upper collets are each disposed within a respective upper collet housing.

* * * * *